US012395405B2

(12) United States Patent
Chertov et al.

(10) Patent No.: US 12,395,405 B2
(45) Date of Patent: Aug. 19, 2025

(54) SHARDED MODEL FOR CONFIGURATION MANAGEMENT AND STATUS RETRIEVAL

(71) Applicant: Arista Networks, Inc., Santa Clara, CA (US)

(72) Inventors: Roman Olegovich Chertov, San Jose, CA (US); Sebastian Sapa, Vancouver (CA); Allan Drew Clarke, Austin, TX (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 9 days.

(21) Appl. No.: 18/164,370

(22) Filed: Feb. 3, 2023

(65) Prior Publication Data

US 2024/0275676 A1 Aug. 15, 2024

(51) Int. Cl.
H04L 12/24 (2006.01)
G06F 15/173 (2006.01)
G06F 16/21 (2019.01)
G06F 16/904 (2019.01)
H04L 12/26 (2006.01)
H04L 29/08 (2006.01)
H04L 41/0853 (2022.01)

(52) U.S. Cl.
CPC ........ H04L 41/0853 (2013.01); G06F 16/212 (2019.01)

(58) Field of Classification Search
CPC . H04L 41/0853; H04L 41/0226; H04L 41/08; H04L 67/565; G06F 16/212
USPC ........................................................ 709/220
See application file for complete search history.

(56) References Cited

U.S. PATENT DOCUMENTS

| | | | | |
|---|---|---|---|---|
| 5,627,979 A | * | 5/1997 | Chang | G06F 16/217 707/999.107 |
| 5,701,453 A | * | 12/1997 | Maloney | G06F 16/217 707/999.102 |
| 7,567,922 B1 | * | 7/2009 | Weinberg | G06Q 30/00 705/26.5 |
| 10,031,960 B2 | * | 7/2018 | Furtwangler | G06F 9/451 |
| 10,516,761 B1 | * | 12/2019 | A | H04L 41/22 |
| 10,785,278 B2 | * | 9/2020 | Shakir | H04L 43/18 |
| 11,165,647 B2 | * | 11/2021 | A | H04L 41/0836 |
| 11,528,190 B2 | * | 12/2022 | Mallipudi | H04L 41/0813 |
| 11,799,737 B1 | * | 10/2023 | Ottamalika | H04L 43/04 |
| 2003/0028651 A1 | * | 2/2003 | Schreckengast | H04L 63/10 705/52 |
| 2003/0046370 A1 | * | 3/2003 | Courtney | H04L 41/0813 715/239 |

(Continued)

FOREIGN PATENT DOCUMENTS

WO WO-2019233616 A1 * 12/2019 ......... H04L 41/0853

*Primary Examiner* — Umar Cheema
*Assistant Examiner* — Golam Mahmud
(74) *Attorney, Agent, or Firm* — Fountainhead Law Group, PC

(57) ABSTRACT

A network device includes an application programming interface (API) to access (read/write) network device configuration and status. For read requests, the API services the request by reading one or more internal data stores to read out the requested data without first reading a data tree that stores network device configuration and state. For write requests, the API services the request by writing data to one or more internal data stores, without first writing to a data tree that stores network device configuration and state.

17 Claims, 10 Drawing Sheets

(56) References Cited

U.S. PATENT DOCUMENTS

| | | | |
|---|---|---|---|
| 2006/0129426 A1* | 6/2006 | Pearson | G06Q 30/0234 |
| | | | 705/14.27 |
| 2011/0153830 A1* | 6/2011 | Dellacha | G06Q 10/10 |
| | | | 709/226 |
| 2017/0131980 A1* | 5/2017 | Velandy | H04L 69/24 |
| 2017/0168786 A1* | 6/2017 | Beckey | G06F 8/30 |
| 2017/0187577 A1* | 6/2017 | Nevrekar | H04L 41/0226 |
| 2017/0339002 A1* | 11/2017 | Sigoure | H04L 41/08 |
| 2020/0412614 A1* | 12/2020 | A | G06F 16/212 |
| 2021/0240513 A1* | 8/2021 | Shevade | G06F 9/5027 |
| 2021/0319015 A1* | 10/2021 | Duda | G06F 16/244 |
| 2022/0217036 A1* | 7/2022 | Dai | H04L 41/0866 |
| 2022/0329489 A1* | 10/2022 | Nayyar | H04L 41/0893 |

* cited by examiner

```
container aa {
    container bb {
        container cc1 {
            container config {
                leaf name {
                    type string;
                }
                leaf max-limit {
                    type int16;
                }
            }
            container state {
                leaf name {
                    type leafref {
                        path '../config/name';
                    }
                }
                leaf count {
                    type int32;
                }
                leaf average-rate {
                    type int64;
                }
            }
        }
        container cc2 {
            ...
        }
    }
}
``` published, public YANG model, 1202

FIG. 12A

```
[[ streamable = everything ]]

struct Config {
    string _name;
    int maxLimit;

[[ streamable = no ]]
    int32 hash;
}

[[ yang::path = "/aa/bb/cc" ]]
[[ sys::path = "/System/root/foo" ]]

struct Foo {
    [[ rename = config ]]
    Config cfg;
}
``` native model, 1212 (annotated)

annotations, 1214

FIG. 12B

```
[[ streamable = everything ]]

struct State {
    string _name;
    int _count;
    int64 averageRate;

[[ streamable = no ]]
    int32 hash;
}

[[ yang::path = "/aa/bb/cc" ]]
[[ sys::path = "/Shared/bar"]]

struct Bar {
    State state;
}
``` native model, 1222 (annotated)

annotations, 1224

FIG. 12C

SHARDED MODEL FOR CONFIGURATION MANAGEMENT AND STATUS RETRIEVAL

BACKGROUND

The present disclosure relates to accessing network device configuration and status of a network device (e.g., switch, router, etc.) using a data model of the network device. A commonly known data model is based on the YANG (Yet Another Next Generation) data modeling language. A YANG data model includes a description (sometimes referred to as the schema) of the data that is contained in a network device, such as configuration (e.g., port configurations) and status (e.g., port state: UP, DOWN, etc.). YANG data models allow users to configure and retrieve status on a network device via standardized protocols such as the Network Configuration (NETCONF) protocol, Google Remote Procedure Call (gRPC) network management interface (gNMI) protocol, and the like.

The network device can store an instance of a YANG data model in its memory (sometimes referred to as the data tree). The data tree stores a copy of the configuration and status (state) information of the network device, while the schema describes the organization of the data tree and the types of data stored in the data tree. A user (client) can configure the network device and read state information via the data model using a suitable application programming interface (API). As noted above, for example, the user can access the data model via the gNMI protocol. The user can configure the network device using a gNMI set request (e.g., SETREQUEST message) to write configuration information to the data tree component of the YANG data model. Conversely, the user can retrieve status using a gNMI get request (e.g., GETREQUEST message) or a gNMI subscribe request (e.g., SUBSCRIBEREQUEST message) to read information from the data tree.

The data tree only represents a copy of the configuration and status of the network device. The actual data that constitutes network device configuration and status is stored among various internal data stores (e.g., databases, forwarding tables stored dynamic and/or static memories, hardware registers, etc.) of the network device. Accordingly, when a user writes configuration data to the data tree, the data is only stored in memory such as RAM (random access memory). The network device copies configuration data stored in RAM to corresponding internal data stores of the network device to actually configure the network device. Likewise, when an update occurs in an internal data store (state change), the network device copies the updated data to locations in RAM where the data model is stored, allowing the user to access the latest state by reading the data tree. This approach however comes at a cost, namely the consumption of memory in order to store the data tree and the consumption of computing resources in order to maintain synchronization between the data tree and the internal data stores (state) of the network device.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 12A, 12B, 12C illustrate examples of public external and native internal data schemas.

DETAILED DESCRIPTION

Figure 1:
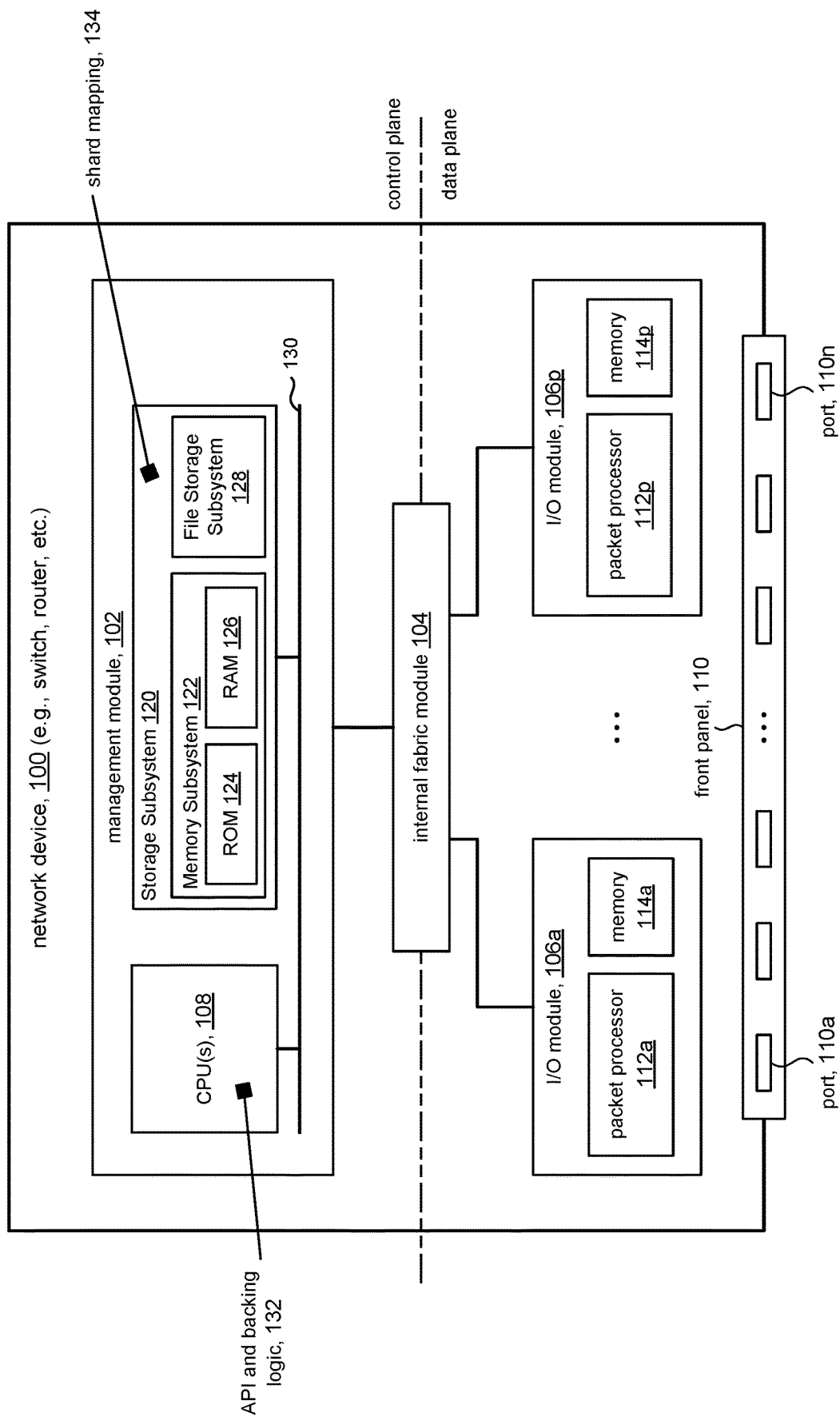
FIG. 1 shows a network device in accordance with some embodiments of the present disclosure.

For discussion purposes only, embodiments of the present disclosure will be explained in the context of the YANG data modeling language and YANG data models. It will be understood that embodiments in accordance with the present disclosure can nonetheless be based on alternatives to YANG. Likewise, for explanation purposes, access to YANG data models will be explained in terms of the gNMI protocol.

Data models, schemas, and data trees are understood. For discussion purposes, the following terminology will be used in the present disclosure:

data model— The data model is a description of the configuration information and status (state) information contained in the network device. The data model can be understood to comprise two components: a data model schema (or simply schema) and a data tree.

schema— The schema describes the organization of the configuration and status information, their data types, and so on. Unless specified otherwise, "data model" and "schema" can be used interchangeably.

data tree— The data tree component of the data model represents an instance of the data model. The data tree contains copies of the actual configuration and status information (data elements) stored in the network device, as specified by the schema.

Both the schema and the data tree are tree-like in that the configuration and status are hierarchically represented. The "schema" defines the hierarchical relation among the configuration and status. The "data tree" represents actual instances (occurrences) of configuration and status (data elements) in the network device. For example, the following path expression represents a part of a schema:

/container-*aa*/list-*bb*/leaf-*cc*

By comparison, the following represent paths in a data tree instantiated in accordance with the above portion of a schema:

/container-*aa*/list-*bb* [name = red]/leaf-*cc*

/container-*aa*/list-*bb* [name = blue]/leaf-*cc*

⋮

/container-*aa*/list-*bb* [name = violet]/leaf-*cc*

The schema path expresses the relation between list-bb and leaf-cc, whereas the data tree paths represent actual instances of leaf-cc. For instance, the example above shows there is one instance of data element leaf-cc for list-bb named red and another instance of data element leaf-cc for list-bb named blue, and so on. The data element leaf-cc will have actual data values; e.g., 5, "abc" and the like.

It can be seen from this example that the memory consumption for storing an instantiated data model (the data tree) can be significant because the data tree stores each occurrence of a value in the network device.

A network device in accordance with the present disclosure can provide a user with a view of a data model (e.g., YANG model) that represents configuration and status data of the network device without storing an instance of the data model, namely the data tree, in the network device (e.g., in RAM). In other words, configuration and status stored among various internal data stores in the network device are not duplicated (collected and stored) in a data tree. In accordance with the present disclosure, the network device stores only shards of a data model representation of the network device thereby reducing the storage requirement in the network device.

The network device includes mapping information that maps shards of the data model (more particularly the schema component) to the various internal data storage devices in the network device, such as, for example, internal databases, forwarding tables, hardware status registers, and so on. An API and associated backing logic can provide access to the data model using the mapping information, allowing a user to configure the network device and retrieve status from the network device in terms of the data model.

In accordance with the present disclosure, access to network device configuration and status is made in terms of the data model schema only, without having to maintain in a RAM of the network device a data tree that contains a copy of various internal data stores of the network device. An API and backing logic in accordance with the present disclosure can support a view of the data model in terms of the schema that allows users to configure the network device and retrieve status from the network device.

Because the network device does not store and maintain a copy of the current configuration and status of the network device in a data tree, embodiments in accordance with the present disclosure can exhibit lower memory (RAM) storage requirements. Embodiments in accordance with the present disclosure can exhibit reduced processor load because there is no need to synchronize a stored data tree with the internal data stores that contain the configuration and status information of the network device.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 is a schematic representation of a network device 100 (e.g., a router, switch, firewall, and the like) that can be adapted in accordance with the present disclosure. In some embodiments, for example, network device 100 can include a management module 102, an internal fabric module 104, one or more I/O modules 106*a*-106*p*, and a front panel 110 of I/O ports (physical interfaces) 110*a*-110*n*. Management module 102 can constitute the control plane (also referred to as a control layer or simply the CPU) of network device 100 and can include one or more management CPUs 108 for managing and controlling operation of network device 100 in accordance with the present disclosure. Each management CPU 108 can be a general-purpose processor, such as an Intel®/AMD® x86, ARM® microprocessor and the like, that operates under the control of software stored in a memory device/chips such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128, which represent non-transitory computer-readable storage devices that can store program code and/or data, which when executed by one or more management CPUs 108, can cause one or more management CPUs 108 to perform operations in accordance with embodiments of the present disclosure.

Memory subsystem 122 can include a number of memories such as main RAM 126 (e.g., static RAM, dynamic RAM, etc.) for storage of instructions and data during program execution, and ROM (read-only memory) 124 in which fixed instructions and data can be stored. File storage subsystem 128 can provide persistent (i.e., non-volatile) storage for program and data files, and can include storage technologies such as solid-state drive and/or other types of storage media known in the art.

Management CPUs 108 can run a network operating system stored in storage subsystem 120. A network operating system is a specialized operating system for network device 100. For example, the network operating system can be the Arista Extensible Operating System (EOS®), which is a fully programmable and highly modular, Linux-based network operating system, developed and sold/licensed by Arista Networks, Inc. of Santa Clara, California. Other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple buses.

Internal fabric module 104 and the one or more I/O modules 106a-106p can be collectively referred to as the data plane of network device 100 (also referred to as data layer, forwarding plane, etc.). Internal fabric module 104 represents interconnections among the various other modules of network device 100. Each I/O module 106a-106p can include a packet processing pipeline, logically represented by respective packet processors 112a-112p and memory hardware 114a-114p, to provide packet processing and forwarding capability. Each I/O module 106a-106p can be further configured to communicate over one or more ports 110a-110n on the front panel 110 to receive and forward network traffic. Packet processors 112a-112p can comprise hardware (circuitry), including for example, data processing hardware such as an ASIC (application specific integrated circuit), FPGA (field programmable array), digital processing unit, and the like. Memory hardware 114a-114p can include lookup hardware, for example, content addressable memory such as TCAMs (ternary CAMs) and auxiliary memory such as SRAMs (static RAM). The forwarding hardware in conjunction with the lookup hardware can provide wire speed decisions on how to process ingress packets and outgoing packets for egress. In accordance with some embodiments, some aspects of the present disclosure can be performed wholly within the data plane.

In accordance with some embodiments, network device 100 can include an API and backing logic (API) 132 that works in conjunction with shard mapping 134. API 132 and shard mapping 134 can provide users with access to a logical view of a data model (e.g., a YANG data model) that represents the configuration and status information of network device 100 without having to store an instance of the data model in the network device.

Figure 2:
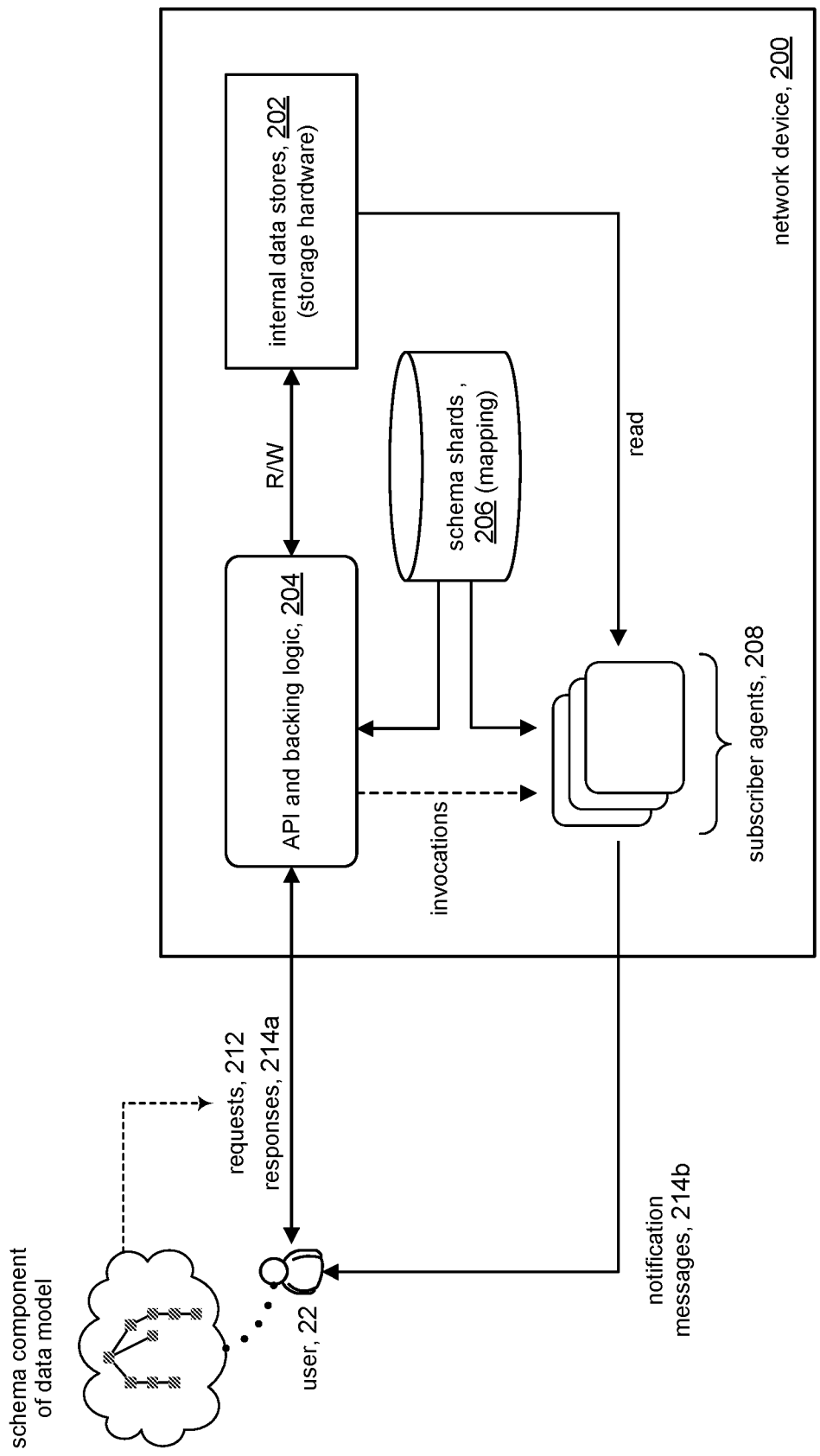
FIG. 2 illustrates accessing network device configuration and status in accordance with some embodiments.

FIG. 2 is a diagrammatic illustration showing details for supporting the logical view of a data model of a network device in accordance with the present disclosure. In some embodiments in accordance with the present disclosure, network device 200 can include internal data stores 202, API and backing logic (API) 204, schema shards (mapping) 206, and subscriber agents 208.

Configuration and status information of the network device can be stored among various internal data stores 202 of the network device. Data stores 202 can include persistent (non-volatile) memory devices and volatile memory devices. Data stores 202 can comprise memory devices and circuits (e.g., DRAM, SRAM, processor registers, etc.), memory storage devices (e.g., flash memory, solid state drives, etc.), and so on. Network device configuration information can include information such as interface names, speed settings, threshold voltages, routing next hop addresses, etc. Network device status information (device state) can include information such as voltage levels, temperatures, traffic counts, LAN performance metrics, link states, etc.

API 204 provides an interface for accessing configuration and status information contained in the various internal data stores of the network device. User 22 can access the network device configuration and status information via API 204 in terms of the user's view of a data model of the network device via the data model's schema. A user request 212 can contain references to configuration information and/or status information (data elements) that are specified in terms of the schema. In some embodiments, for example, the schema can be based on a standardized, publicly available YANG data model of the network device. A standardized schema provides a common view of the network device to network administrators and third party developers.

Shard mapping 206 can comprise mapping information in accordance with the present disclosure. The mapping information can be stored in a suitable data store in the network device. The data model schema represents network device configuration and status independently of how the data is actually stored among the internal data stores of the network device. In accordance with the present disclosure, shard mapping 206 provides a mapping between portions of the data model schema (referred to as schema shards or shards) referenced in a user request 212 to one or more corresponding internal data stores 202 of the network device. Data obtained from the one or more internal data stores can be combined into a response 214a that is sent back to the user.

Subscriber agents 208 can include background processes that execute in network device 200 to retrieve configuration and status from the internal data stores 202. API 204 can invoke one or more subscriber agents 208 in response to a user request 212 to provide continuous readout of information (telemetry) from the network device. Subscriber agents 208 can be active or passive. For example, an active subscriber agent can periodically poll a data store for information. Alternatively, a passive subscriber agent can be interrupt driven; e.g., the subscriber agent can be triggered on the occurrence of an event in the network device (e.g., timer timeout, link down, etc.). Subscriber agents can transmit data to the user via notification messages 214b.

Figure 3:
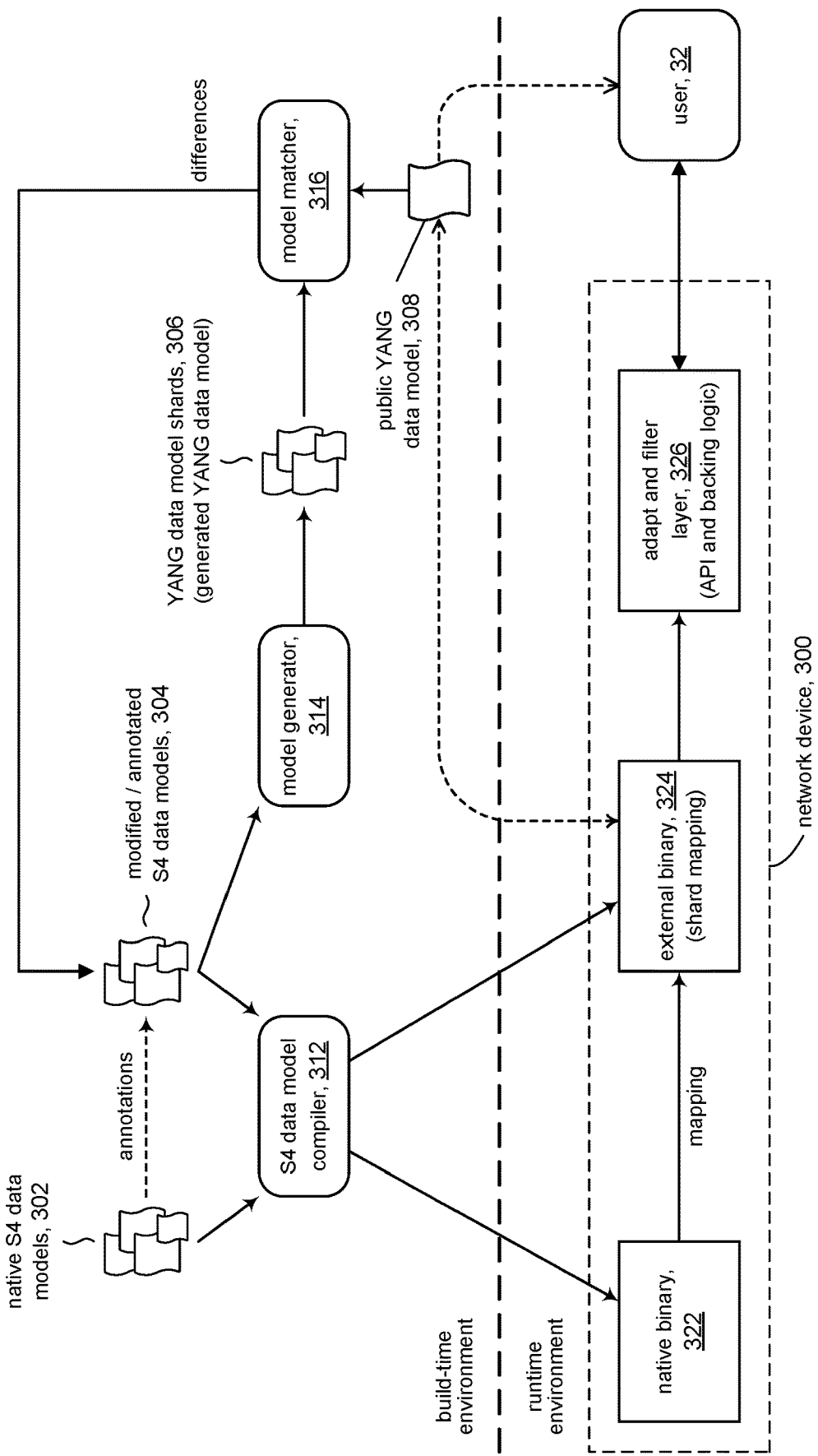
FIG. 3 illustrates an example for generating elements of a sharded data schema in accordance with some embodiments.

FIG. 3 shows details of an embodiment for accessing (e.g., read and write) network device configuration and status in accordance with the present disclosure. The configuration and status information in a network device can be represented with one or more data models 302. The data models can be expressed in any suitable data modeling language. For discussion purposes, we can assume without loss of generality that the data models are expressed in a data modeling language called S4 data modeling language; S4 can be a known data modeling language or a proprietary language. Configuration and status information is generally stored in internal data stores in the network device that may not be readily accessible by the user. Moreover, the internal structures (hardware and data) in a network device can vary significantly from one vendor to another. As such, the resulting S4 data model for a given network device is likely to be unique to that network device.

To facilitate and support users (e.g., network administrators), standardized models of network devices have been developed using the YANG data modeling language. FIG. 3, for instance, shows that a user (client) 32 can view the network device 300 in terms of a standardized public YANG model 308. The public YANG model can provide device vendors, users, and third party developers with a common view of a network device to facilitate support of the network device.

FIG. 3 shows a build-time environment that illustrates operations for generating support data for the runtime environment. In some embodiments, for example, the build-time environment includes native data models (schemas) 302 that represent the network device 300 in terms of its data (e.g., configuration and status); e.g., there can be a data model for configuration and a separate data model for status. The data models 302 are "native" in that they may be specific to the internal structure of the network device and may contain proprietary information that is not exposed to the public. The native data models may be proprietary models used by the developer (vendor) of the network device. For example, FIG. 3 shows that the data models 302 can be expressed in a proprietary data modeling language, which for discussion purposes we will call S4 data modeling language.

The data models 302 can be annotated (e.g., by an automated process, by a user, etc.) to produce annotated data models (annotated schemas) 304 that include information (e.g., pragmas, compiler directives, etc.) to back the public-facing elements of a public YANG model 308 that are supported by the network device. See, for example, annotations 1214 and 1224 in FIGS. 12B and 12C, respectively. An S4 compiler 312 can compile the data models 302, 304 to generate binaries (e.g., native binary 322, external binary 324 respectively) that can be downloaded to the network device (runtime environment).

Model generator 314 can compile the annotated native data models 304 to generate YANG data model (schema) equivalents 306 of the annotated data models, which are collectively referred to as a generated YANG data model. While the public YANG data model 308 generally models the data of a hypothetical fully-featured network device, any given instance of a network device may not implement or support all the data that is represented by the public YANG model. As such, the generated YANG data model 306 may represent only a subset of the full public YANG data model 308.

The native models 302 and the annotated models 306 may not initially match the public YANG data model, and as such data requests made on the network device that are based on the public YANG data model may produce erroneous results or error messages. In accordance with the some embodiments, model matcher 316 can compare the generated YANG data model 308 with corresponding portions of the public YANG data model 308 to identify differences that can be used to modify the annotations made to the native models 302 and/or the native models themselves to produce a proper representation of those portions of the public YANG data model supported in the network device. This aspect of the present disclosure is discussed in more detail below.

The runtime environment includes a native binary 322 and an external binary 324. As noted above, the native binary 322 can be generated by compiling (e.g., with compiler 312) the S4 data models 304 to generate a representation that can be processed by the network device. Likewise, the external binary 324 represents a compiled version of the annotated S4 data models 306 that can be processed by the network device. The annotated S4 data models 306 can be further enhanced (manually or by an automated process) by adding mapping information to the native binary 322. The external binary 324 can be viewed as an internal representation of the public YANG model 308 expressed in terms of the annotated S4 data models 306. The external binary 324 can serve as a mapping between data referenced by paths expressed in the standard YANG data model and the various internal data stores in the network device that store the data.

The adapt and filter layer 326 translates requests from user 32 using the mapping information contained in the external binary 324. The user's view of network device configuration and status information is in reference to the public YANG data model 308. As such, requests from user 32 will refer to elements in the public YANG data model. The adapt and filter layer 326 translates between references to the public YANG data model and references to the external binary.

Figure 4:
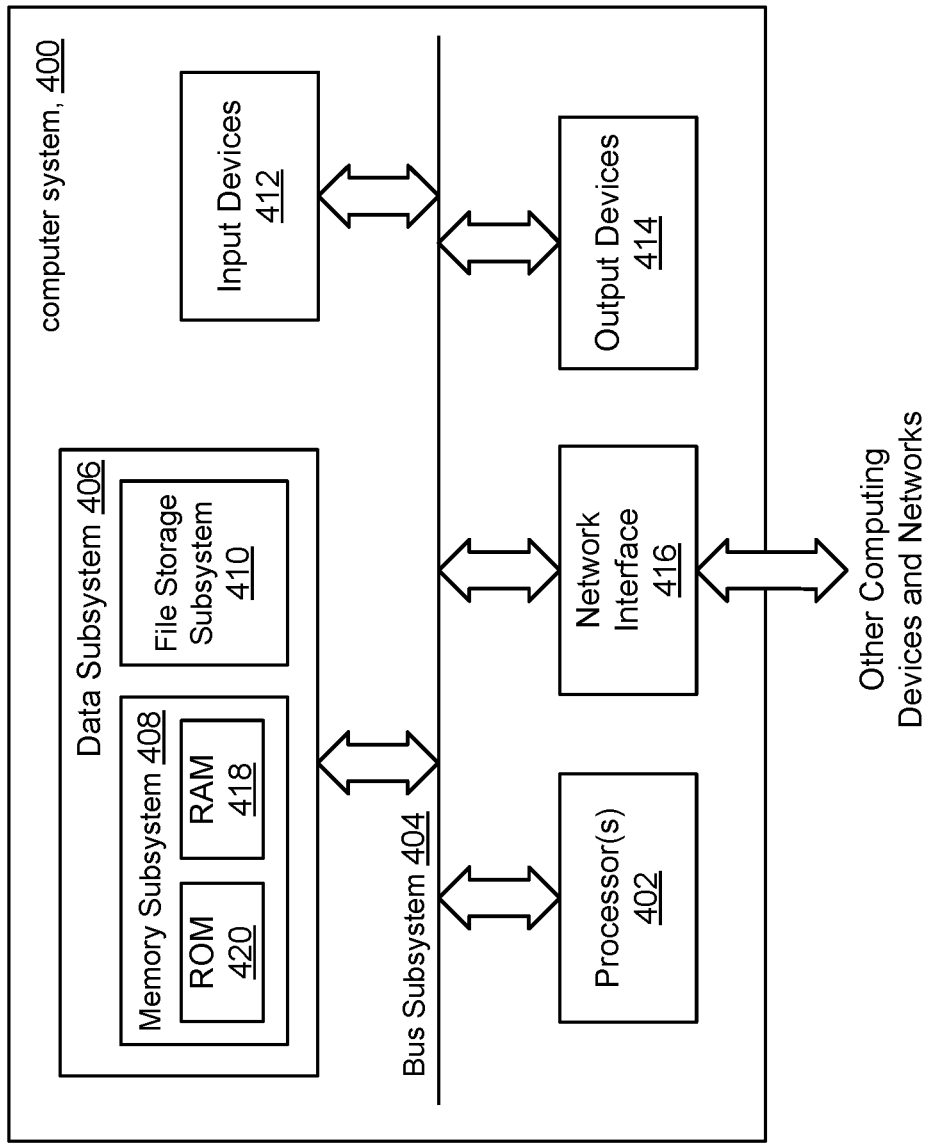
FIG. 4 shows an illustrative computer system in accordance with some embodiments.

FIG. 4 shows an illustrative computing system 400 adapted in accordance with the present disclosure for the build-time environment shown in FIG. 3. As shown in FIG. 4, computer system 400 can include one or more processors 402 that communicate with a number of peripheral devices via bus subsystem 404. These peripheral devices include data subsystem 406 (comprising memory subsystem 408 and file storage subsystem 410), user interface input devices 412, user interface output devices 414, and network interface subsystem 416.

Bus subsystem 404 can provide a mechanism that enables the various components and subsystems of computer system 400 to communicate with each other as intended. Although bus subsystem 404 is shown schematically as a single bus, alternative embodiments of the bus subsystem can utilize multiple buses.

Network interface subsystem 416 can serve as an interface for communicating data between computer system 400 and other computer systems or networks. Embodiments of network interface subsystem 416 can include, e.g., an Ethernet card, a Wi-Fi and/or cellular adapter, a modem (telephone, satellite, cable, ISDN, etc.), digital subscriber line (DSL) units, and/or the like.

User interface input devices 412 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 400.

User interface output devices 414 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 400.

Data subsystem 406 includes memory subsystem 408 and file/disk storage subsystem 410 represent non-transitory computer-readable storage media that can store program code and/or data, which when executed by processor 402, can cause processor 402 to perform operations in accordance with embodiments of the present disclosure.

Memory subsystem 408 includes a number of memories including main random access memory (RAM) 418 for storage of instructions and data during program execution and read-only memory (ROM) 420 in which fixed instructions are stored. File storage subsystem 410 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 400 is illustrative and other configurations can have more or fewer components than system 400.

Figure 5:
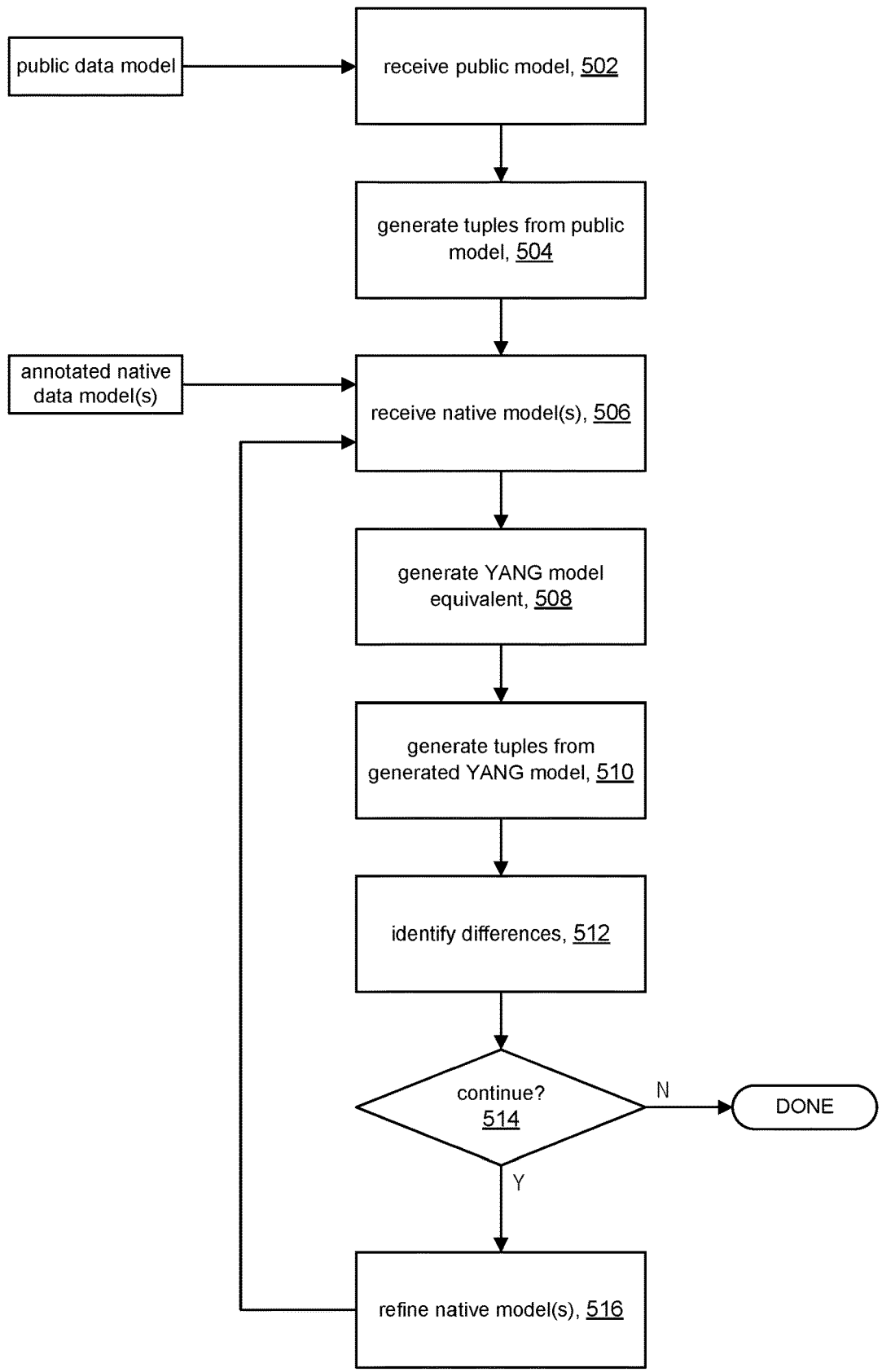
FIG. 5 is a flow of operations in a build-time environment in accordance with some embodiments.

Referring to FIG. 5, the discussion will now turn to a description of processing in a computer system (e.g., model matcher 316, FIG. 3) of the build-time environment for adapting native models (e.g., 302) of a target network device to match a public data model (e.g., 308) of the network device in accordance with the present disclosure. As noted above, native data models represent the actual data structures of the target network device. The native models may be expressed in a non-standard modeling language. The native models may model proprietary structures in the target network device, and so on. As such, they may not be suitable for users and third party developers. By comparison, the public published data model is intended to be used by users and third party developers. The native data models can be adapted to sufficiently match the public data model so that the run-time environment can be built using the native data models and accessed in terms of the public data model.

In some embodiments, for example, the computer system can include computer executable program code (e.g., stored on a non-transitory computer-readable storage memory device), which when executed by a processor (e.g., 402, FIG. 4) in the computer system, may cause the computer system to perform the processing in accordance with FIG. 5. The operations described below are not necessarily executed in the order shown. Operations can be combined or broken out into smaller operations in various embodiments. Operations can be allocated for execution among one or more concurrently executing processes and/or threads.

At operation 502, the computer system can receive a public data model of the target network device; e.g., a published YANG data model (e.g., data model 308, FIG. 3).

At operation 504, the computer system can reduce the received public data model to a set of tuples that collectively represent the hierarchical structure of the data model. Each leaf node in the data model represents or otherwise models a datum in the target network device. In some embodiments, each tuple corresponds to a leaf node in the data model. The tuple for a leaf node in the data model can include the following tuple elements: path to the leaf node, a type-name of the type of data (e.g., integer, character, floating-point, etc.) contained in the leaf node, and additional attributes (e.g., read-writable, read-only, and so on). Referring to the published YANG data model 1202 shown in FIG. 12A, for example, consider the leaf node called max-limit. This leaf can be represented by the following tuple:

$$\{<aa, bb, cc1, config, \text{max-limit}>, int16, RW, \text{etc.}\}$$

where <aa, bb, cc1, config, max-limit> represents a path from the root (aa) to the max-limit leaf node,
int16 is the data type of the data contained in max-limit,
RW is an access attribute, which in this example indicates that the data in max-limit is read-writable, and
in some embodiments, the tuple can include additional attributes.

The leaf node called count can be represented by the tuple:

$$\{<aa, bb, cc1, \text{state}, \text{count}>, int32, R\text{-only}, \text{etc.}\}$$

and so on. It can be seen that the YANG data model 1202 can be expressed as a set of such tuples.

At operation 506, the computer system can receive the native data model(s) for the target network device. In some embodiments, the native data models can be annotated (e.g., 304) to facilitate matching the native models to the public YANG data model.

At operation 508, the computer system can generate YANG equivalents of the annotated native models (e.g., 306). As noted above, the native models can be expressed in a modeling language different from the public model. For example, the native models may be expressed in a language called S4, whereas the public model may be expressed in YANG.

At operation 510, the computer system can generate a set of tuples from the generated YANG data model to represent the data model, for example, as described above in connection with operation 504.

At operation 512, the computer system can identify differences between the generated YANG model and the public YANG model. In some embodiments, differences between the generated and public YANG models can be determined based on differences between the (generated) tuples that constitute the generated YANG model and (public) tuples that constitute the public YANG model. In some embodiments, for example, the set of generated tuples can be compared to the set of public tuples. If the generated tuples is a subset of the public tuples, the generated YANG model and the public YANG model can be deemed to be equivalent. Generated tuples that are deemed different can be flagged for further processing (operation 516). The determination that two tuples are different can be algorithmically driven (e.g., using machine learning) or made by a human user.

It is noted that tuples in the public YANG model that do not correspond to tuples in the generated YANG model can be ignored. For example, the target network device may not fully implement the data modeled by the public YANG model, and so the tuples of the generated YANG model may only be a subset of the tuples of the public YANG model.

The comparison of a public tuple and a generated tuple can comprise matching corresponding elements between the two tuples; for example, the path element in both tuples can be compared, the data type element in both tuples can be compared, etc. It is noted that the comparison does not require an exact match between the two tuples, but rather need only be deemed "close enough" to avoid errors when users access the network device using the public model. Error messages would make references to the generated model rather than the public model, which can lead to confusion. Consider, for example, the following tuple:

/components/component[name=]/transceiver/physical– channels/channe/[index=]/index oc–type:*vlanid* string *r*

"Close enough" usually applies to everything but the path; the path must match. Therefore, the path:

/components/component[name=] / transceiver/ physical–channels/channel[index=]/ should occur in both the public model and the generated model. However, the generated model might reference oc-types:vlanid as a string, whereas the public model might be using a plain integer for vlanid. Although the two tuples are not identical, the difference would nonetheless be deemed close enough because a client who knows about vlanid would get a notification from a model which has an integer there, and the client would not know the difference. In other words, a notification that comes from a public model would be identical to a notification that comes from the generated model.

At decision point 514, the computer system can report any differences to a user (or to an automated process). If the differences between the tuples of the generated model and tuples of the public model are acceptable, then processing can conclude. If the differences between the tuples of the generated model and tuples of the public model are not acceptable, then processing can continue to operation 516.

At operation 516, the computer system can use the differences between the generated tuples and the public tuples to revise/refine the annotated data models (e.g., 304), including modifying the models themselves and/or the annotations added to the models. This activity can be algorithmically driven (e.g., using machine learning) or performed by a human. Processing can return to operation 506 to repeat the process one or more times so that the generated YANG model can be a proper representation of a subset of the public YANG model.

Figure 6:
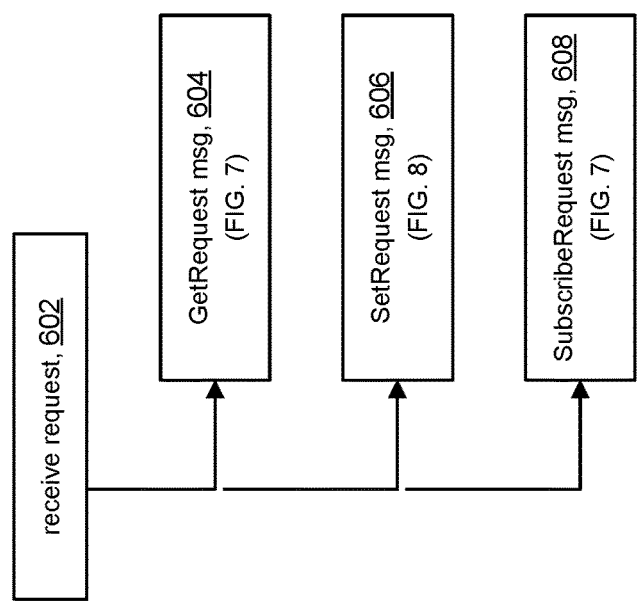
FIG. 6 illustrates dispatching network device configuration and status requests.

Referring to FIG. 6, the discussion will now turn to a description of processing in a network device for accessing network device configuration and status in accordance with the present disclosure. FIG. 6 shows operations in a user interface (UI; e.g., API and backing logic 204) for dispatching requests. At operation 602, the UI can receive a request (e.g., from a user). For discussion purposes, the requests will be based on the gNMI protocol for accessing YANG data models. For example, a GETREQUEST message can be serviced at operation 604 to read information (e.g., status) from one or more internal storage devices of the network device. A SETREQUEST message can be serviced at operation 606 to write information to one or more of the internal storage devices of the network device. A SUBSCRIBEREQUEST message can be serviced at operation 608 to notify a receiver (e.g., the client) when changes in network device status occur.

Figure 8:
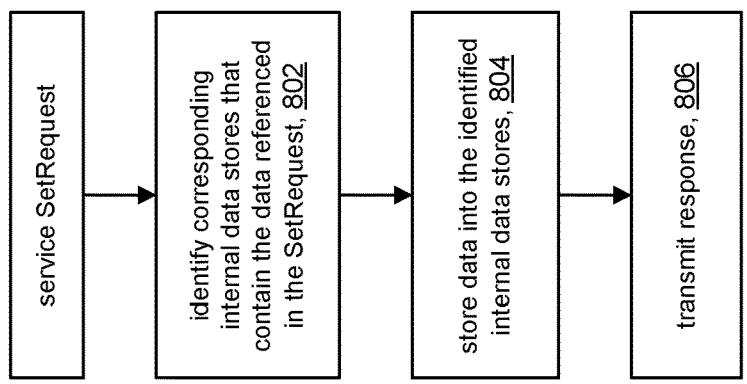
FIG. 8 illustrates servicing a write request in accordance with some embodiments.
Figure 7:
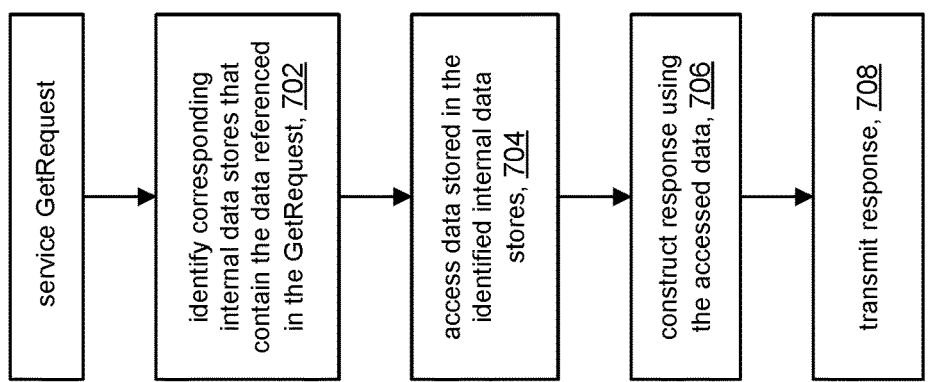
FIG. 7 illustrates servicing a read request in accordance with some embodiments.
Figure 9:
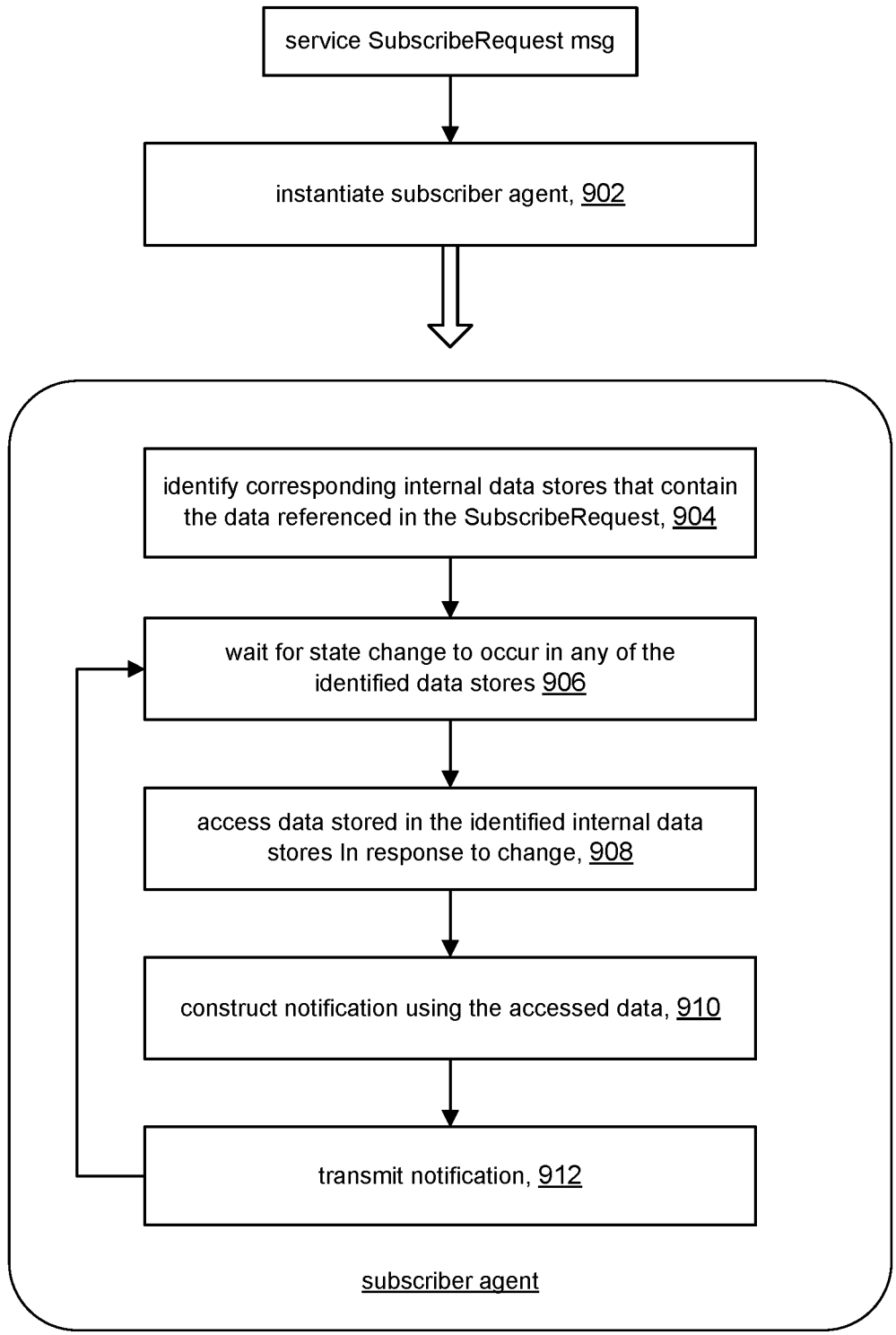
FIG. 9 illustrates servicing a subscribe request in accordance with some embodiments.

Referring to FIGS. 7, 8, and 9, the discussion will now turn to a high-level descriptions of processing in a network device (e.g., adapt and filter layer 326, FIG. 3) for servicing GET, SET, and SUBSCRIBE requests in accordance with the present disclosure. In some embodiments, for example, the network device can include one or more digital processing units (circuits), which when operated, can cause the network device to perform processing in accordance with FIGS. 7, 8, and 9. Digital processing units (circuits) in the control plane can include general CPUs that operate by way of executing computer program code stored on a non-volatile computer readable storage medium (e.g., read-only memory); for example, CPU 108 in the control plane (FIG. 1) can be a general CPU. Digital processing units (circuits) in the data plane can include specialized processors such as digital signal processors, field programmable gate arrays, application specific integrated circuits, and the like, that operate by way of executing computer program code or by way of logic circuits being configured for specific operations. For example, each packet processor 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

FIG. 7 shows servicing of a GETREQUEST message in accordance with some embodiments, where:

At operation 702, the network device can identify one or more internal data stores in the network device that correspond to one or more data references (paths) specified in the GETREQUEST message. Additional details of the mapping between paths and internal data stores are described in connection with examples described below.

At operation 704, the network device can read out (access) data contained in the one or more identified data stores in the network device.

At operation 706, the network device can construct a response comprising the accessed data.

At operation 708, the network device can transmit the response, for example, in a GETRESPONSE message.

FIG. 8 shows servicing of a SETREQUEST message in accordance with some embodiments, where:

At operation 802, the network device can identify one or more internal data stores in the network device that correspond to one or more data references (paths) specified in the SETREQUEST message. Additional details of the mapping between paths and internal data stores are described in connection with examples described below.

At operation 804, the network device can write, store, or otherwise update the one or more identified data stores in the network device with the data specified in the SETREQUEST message.

At operation 806, the network device can transmit a SETRESPONSE message that indicates a result from updating each of the specified data in the SETREQUEST message.

FIG. 9 shows servicing of a SUBSCRIBEREQUEST message in accordance with some embodiments, where:

At operation 902, the network device can instantiate a background process referred to herein as a subscriber agent to service the subscription specified in the SUBSCRIBEREQUEST message. A subscription is used when a user wishes to receive updates relating to network device status on an ongoing basis. In some embodiments, the subscriber agent executing in the background can provide the ongoing updates as follows:

At operation 904, the subscriber agent can identify one or more internal data stores in the network device that correspond to one or more data references (paths) specified in the SUBSCRIBEREQUEST message. Additional details of the mapping between paths and internal data stores are described in connection with examples described below. It will be appreciated that in some embodiments the mapping between paths and internal data stores can be performed as a one-time operation at the time the subscriber agent is instantiated.

At operation 906, the subscriber agent can trigger on the occurrence of a state change in any of the identified internal data stores. In some embodiments, the trigger can be asynchronous in that a trigger occurs when an event occurs; e.g., when a link unexpectedly goes down. In other embodiments, the trigger can be based on a timer; e.g., in order to periodically read out a data store such as a packet counter regardless of whether the data store changed.

At operation 908, the subscriber agent can read out (access) data contained in the one or more identified data stores in the network device.

At operation 910, the subscriber agent can construct a subscription notification comprising the accessed data.

At operation 912, the subscriber agent can transmit the notification to a receiver. Processing can return to operation to wait for the next state change.

Figure 10:
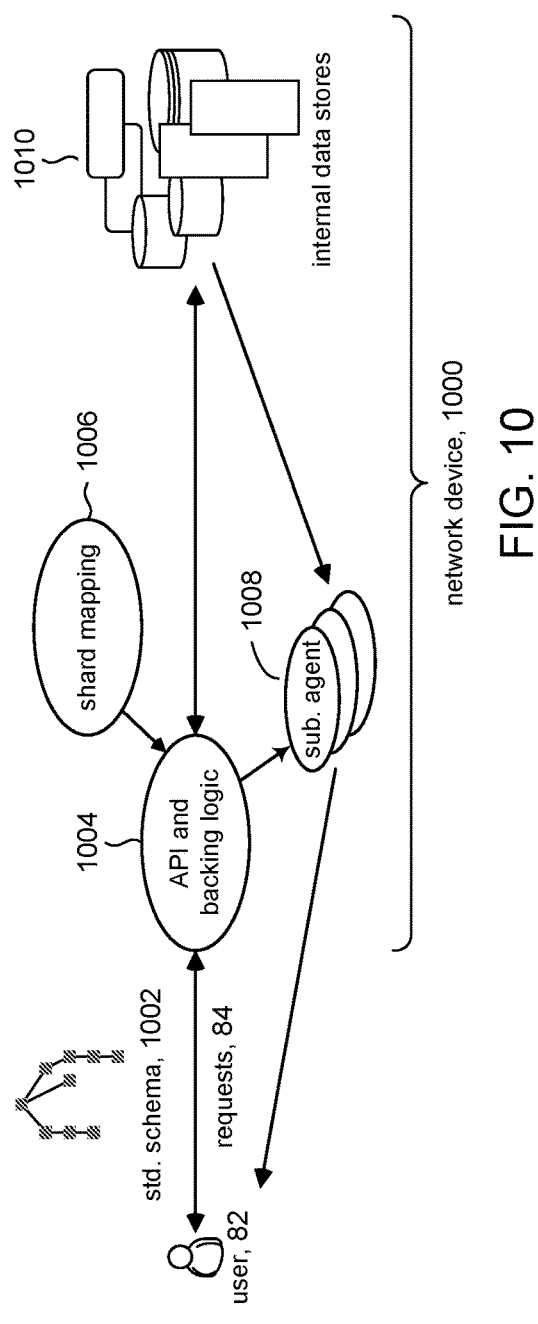
FIG. 10 is a graphic illustration for servicing requests network device configuration and status in accordance with some embodiments.
Figure 11:
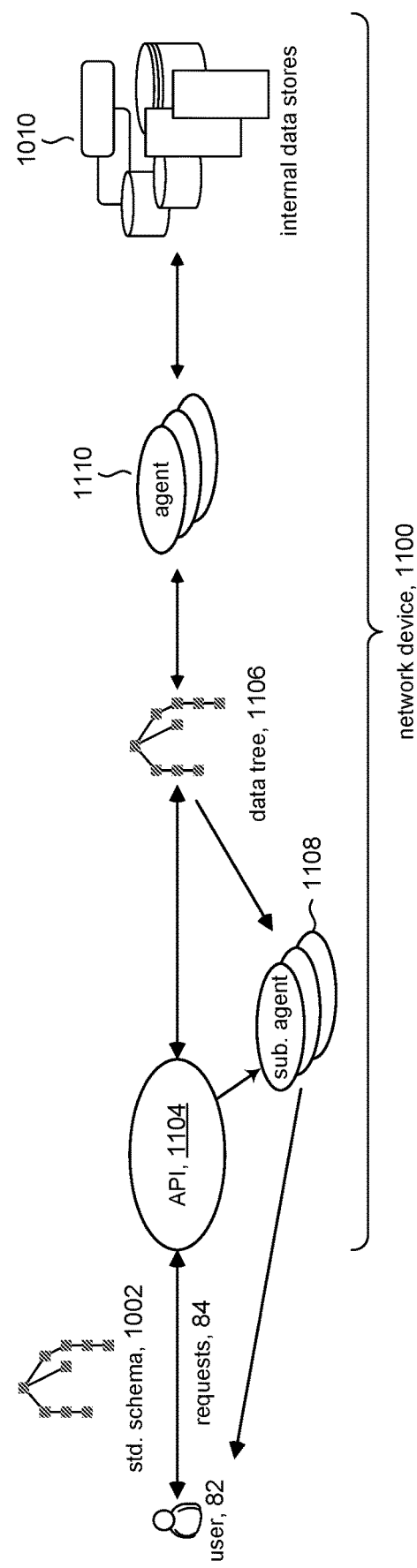
FIG. 11 shows conventional processing for servicing network device configuration and status requests.

FIG. 10 graphically illustrates the operations described in connection with FIGS. 6-9 for accessing (read/write) network device configuration and status in comparison with conventional processing, as represented in FIG. 11 for example. Referring to FIG. 10, a user 82 can access configuration and status data of network device 1000 by issuing requests 84 that comprise references to the data in terms of a standardized schema 1002. API and backing logic 1004 can identify internal data stores 1010 that contain the referenced data using shard mapping information 1006. The API then directly accesses the identified internal data stores to read out the data from the internal data stores or write data to the internal data stores. The API can service subscription requests by instantiating subscriber agents 1008 that can also directly access the identified internal data stores.

Conventional processing on the other hand, such as shown in FIG. 11 for example, includes storing and maintaining a data tree 1106, instantiated in accordance with schema 1002, that stores network device configuration and status copied from the internal data stores 1010. Agents 1110 executing in network device 1100 can read out network device status from internal data stores 1010 and store the read data into data tree 1106. API 1104 services read requests by reading out data from the data tree 1106 instead of reading out data from internal data stores 1010. Likewise, subscription requests can be serviced by subscriber agents 1108 reading out data from data tree 1106 instead of reading out data from internal data stores 1010. Conversely, API 1104 services write requests by writing data to the data tree 1106 instead of writing data to the internal data stores 1010. Agents 1110 then store data written to data tree 1106 into corresponding internal data stores 1010. It can be appreciated that network device 1100 consumes memory in order to hold the data tree 1106 (e.g., in dynamic RAM). Network device 1100 further incurs additional processing load for agents 1110 in order to maintain configuration and status synchronization between the data tree 1106 and the internal data stores 1010.

The discussion will now turn to illustrative examples. FIG. 12A shows a highly simplified example of a published, public (target) YANG model 1202. The target model 1202 models or otherwise represents data in a given network device, such as configuration data and state data. The target model can provide a common view of the data contained in the given network device in order to facilitate vendor support and third party development.

The vendor may develop one or more internal (native) models to model the network device. FIGS. 12B and 12C, for instance, illustrate examples of internal native models 1212, 1222 that may be developed and used by the vendor. The native models 1212, 1222 can cover different portions of the target model 1202. The native models 1212, 1222 represent shards of the target model 1202. For example, native model 1212 can model the configuration information portion of the target model, and native model 1222 can model the state information portion of the target model. As explained above, the native models can be expressed in a modeling language different from that used to represent the target model 1202. In some embodiments, the vendor can use a proprietary modeling language.

Native model 1212 represents a portion of target model 1202 that contains configuration information, which in our highly simplified example, comprises the quantity MAXLIMIT. Things worth noting about the native model 1212:
- The value for the yang::path attribute is an annotation that specifies the target model pathname that the client will use to access the native model.
- The sys::path attribute is an annotation that indicates which internal data store among the internal data stores of the network device contains this model; in this example the internal data store is called SYSTEM.
- The value for the sys::path attribute specifies the pathname of the location in the SYSTEM internal data store where the model is stored.
- The corresponding data between the target model and the native model can have different identifiers. For example, the configuration variable in the target model identified as NAME is identified in the native model as _NAME. The configuration variable in the target model identified as MAX-LIMIT is identified in the native model as MAXLIMIT, and so on.
- The root of the local tree will be an instance of a Foo data structure.

The YANG paths (i.e., paths seen by the client) represented by native model 1212 are:

/aa/bb/cc/config/_name (string)

/aa/bb/cc/config/max-limit (int32)

The internal paths in the native model 1212 that correspond to the YANG paths are:

/System/root/*foo*/cfg/name (string)

/System/root/*foo*/cfg/maxLimit (int)

Native model 1222 represents a portion of target model 1202 that contains state information, which in our highly simplified example, comprises the quantity COUNT. Things worth noting about the native model 1222:
- The value for the yang:path attribute is an annotation that specifies the target model pathname that the client will use to access the native model.
- The value for the yang:path attribute is the same as in the native model 1212 part, causing the native models 1212, 1222 to overlay.
- The sys::path attribute is an annotation that indicates which internal data store on the network device contains this model; in this example the internal data store is called SHARED.
- sys::path also shows where the tree will reside in that store
- The value for the sys:path attribute specifies the pathname of the location in the SHARED internal data store where the model is stored.
- The root of the local tree will be an instance of a BAR data structure.

The YANG paths (i.e., paths seen by the client) represented by native model 1222 are:

/aa/bb/cc/state/name (string)

/aa/bb/cc/state/count (int32)

/aa/bb/cc/state/average-rate (int64)

The internal paths in the native model 1222 that correspond to the YANG paths are:

/Shared/bar/state/_name (string)

/Shared/bar/state/_count (int)

/Shared/bar/state/averageRate (int64)

Examples of requests made on the target model 1202 will now be described in the context of a gNMI request. Suppose a user wanted to access state information on the network device whose data is modeled according to target model 1202. The user can issue the following GET request:

gnmi −u user −p pwd localhost:3060 get/aa/bb/cc/state

The network device can map the pathname/aa/bb/cc/state in the request (e.g., via API backing logic 326 and mapping 324) to the pathname/Shared/bar/state which points to the internal data store that contains the state variables _NAME, _COUNT, and AVERAGERATE that correspond to the state variables in the target model, namely NAME, COUNT, and AVERAGE-RATE.

While the GET request is used to obtain a snapshot of data from the network device, the following SUBSCRIBE request can be used to obtain multiple responses as changes to the data occurs:

gnmi −u user −p pwd localhost:3060 subscribe/aa/bb/cc/config/max−limit

Likewise, suppose a user wanted to set a configuration on the network device whose data is modeled according to target model 1202. The user can issue the following SET request:

gnmi −u user −p pwd localhost:3060 set/aa/bb/cc/config/max−limit 500 to set the max-limit configuration variable. The network device can map the pathname /aa/bb/cc/config/max-limit in the request (e.g., via API backing logic 326 and mapping 324) to the pathname/System/root/foo/cfg/maxLimit which points to the location in the internal data stores of the network device that contains the specified configuration variable.

Further Examples

Features described above as well as those claimed below may be combined in various ways without departing from the scope hereof. The following examples illustrate some possible, non-limiting combinations:

(A1) A method for accessing data in a network device, the method comprising: storing mapping information between data elements of a public data model of the network device and a plurality of internal data stores of the network device that contain information referenced by the data elements of the public data model, wherein the public data model comprises a schema that represents an organization of network device configuration data and network device status data, wherein the mapping information comprises a plurality of shards of the schema, wherein each of the plurality of shards is mapped to one or more of the plurality of internal data stores; receiving a user request to access information in the network device, the user request being expressed in terms of one or more of the data elements of the public data model; using the mapping information to identify one or more of the internal data stores of the network device that correspond to the one or more data elements of the public data model in the user request; and servicing the user request by accessing the one or more identified internal data stores.

(A2) For the method denoted as (A1), the network device does not store an instance of the public data model that comprises current configuration and status data of the network device.

(A3) For the method denoted as any of (A1) through (A2), servicing the user request includes accessing information stored in at least a first internal data store and a second internal data store.

(A4) For the method denoted as any of (A1) through (A3), the public data model is expressed in a data modeling language.

(A5) For the method denoted as any of (A1) through (A4), the user request is a request to store data in the network device, servicing the user request includes writing the data to the one or more identified internal data stores.

(A6) For the method denoted as any of (A1) through (A5), the data is configuration data to configure the network device.

(A7) For the method denoted as any of (A1) through (A6), the user request is a request to read data stored in the network device, servicing the user request includes reading the data from the one or more identified internal data stores and transmitting the read data to a consumer of the read data.

(A8) For the method denoted as any of (A1) through (A7), reading the data includes reading configuration information from a first internal data store and reading status information from a second internal data store.

(A9) For the method denoted as any of (A1) through (A8), servicing the user request includes repeatedly reading the data from the one or more identified internal data stores and streaming the read data to a consumer of the read data.

(A10) For the method denoted as any of (A1) through (A9), the mapping information is generated by annotating one or more native data models of the network device, the annotated native data models correspond to the shards of the public data model.

(A11) For the method denoted as any of (A1) through (A10), the mapping information is generated further by: comparing the annotated native data models to the public data model; and further annotating the native data models using differences identified by the comparing.

(A12) For the method denoted as any of (A1) through (A11), comparing the annotated native data models to the public data model includes generating first tuples from the native data models and second tuples from the public data model and comparing the first tuples and the second tuples.

(A13) The method denoted as any of (A1) through (A12), further comprising converting the annotated native data models to produce generated data models that are expressed in a data modeling language same as the data modeling language of the public data model.

(B1) A method in a network device, the method comprising: receiving a user request to access configuration information or status information in the network device, the user request being expressed in terms of one or more of the data elements of a public data model of the configuration and status information, wherein the configuration and status information is stored among a plurality of internal data stores in the network device; identifying one or more of the internal data stores of the network based on references to the one or more data elements in the user request; and servicing the user request by accessing the one or more identified internal data stores.

(B2) For the method denoted as (B1), accessing the one or more identified internal data stores includes accessing the one or more identified internal data stores without accessing a data tree.

(B3) For the method denoted as any of (B1) through (B2), the user request is expressed using gNMI (gRPC Network Management Interface) protocol.

(B4) For the method denoted as any of (B1) through (B3), the user request is a request to store data in the network device, wherein servicing the user request includes writing the data to the one or more identified internal data stores.

(B5) For the method denoted as any of (B1) through (B4), the user request is a request to read data stored in the network device, wherein servicing the user request includes reading the data from the one or more identified internal data stores and transmitting the read data to a consumer of the read data.

(C1) A network device comprising: one or more computer processors; and a computer-readable storage device comprising instructions that control the one or more computer processors to: receive a user request to access configuration information or status information in the network device, the user request being expressed in terms of one or more of the data elements of a public data model of the configuration and status information, wherein the configuration and status information is stored among a plurality of internal data stores in the network device; identify one or more of the internal data stores of the network based on references to the one or more data elements in the user request; and service the user request by accessing the one or more identified internal data stores.

(C2) For the network device denoted as (C1), accessing the one or more identified internal data stores includes accessing the one or more identified internal data stores without first accessing a data tree.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for accessing data in a network device, the method comprising:

storing mapping information between data elements of a public data model of the network device and a plurality of internal data stores of the network device that contain information referenced by the data elements of the public data model, wherein the public data model comprises a schema that represents an organization of network device configuration data and network device status data, wherein the network device does not store an instance of the public data model that comprises current network device configuration and network device status data in a main memory of the network device, wherein the mapping information comprises a plurality of shards of the schema, and wherein each of the plurality of shards is mapped to one or more of the plurality of internal data stores;

receiving, by an application programming interface (API) component of the network device, a user request to access information in the network device, the user request being expressed in terms of one or more of the data elements of the public data model;

using, by the API component, the mapping information to identify one or more of the internal data stores of the network device that correspond to the one or more data elements of the public data model in the user request; and servicing, by the API component, the user request by directly accessing the one or more identified internal data stores, wherein the servicing of the user request is performed without duplicating the configuration and status information from the one or more identified internal data stores to a data structure instantiated in accordance with the public data model.

2. The method of claim 1, wherein servicing the user request includes accessing information stored in at least a first internal data store and a second internal data store.

3. The method of claim 1, wherein the public data model is expressed in a data modeling language.

4. The method of claim 1, wherein the user request is a request to store data in the network device, wherein servicing the user request includes writing the data to the one or more identified internal data stores.

5. The method of claim 4, wherein the data is configuration data to configure the network device.

6. The method of claim 1, wherein the user request is a request to read data stored in the network device, wherein servicing the user request includes reading the data from the one or more identified internal data stores and transmitting the read data to a consumer of the read data.

7. The method of claim 6, wherein reading the data includes reading configuration information from a first internal data store and reading status information from a second internal data store.

8. The method of claim 1, wherein the user request is a request to receive updates pertaining to data stored in the network device, and wherein servicing the user request includes periodically reading the data from the one or more identified internal data stores and streaming the read data to a consumer of the read data.

9. The method of claim 1, wherein the mapping information is generated by annotating one or more native data models of the network device, wherein the annotated native data models correspond to the shards of the public data model.

10. The method of claim 9, wherein the mapping information is generated further by:

comparing the annotated native data models to the public data model; and further annotating the native data models using differences identified by the comparing.

11. The method of claim 10, wherein comparing the annotated native data models to the public data model includes generating first tuples from the native data models and second tuples from the public data model and comparing the first tuples and the second tuples.

12. The method of claim 11, further comprising converting the annotated native data models to produce generated data models that are expressed in a data modeling language same as the data modeling language of the public data model.

13. A method in a network device, the method comprising:

receiving, by an application programming interface (API) component of the network device, a user request to access configuration information or status information in the network device, the user request being expressed in terms of one or more of the data elements of a public data model of the configuration and status information, wherein the configuration and status information is stored among a plurality of internal data stores in the network device, and wherein the network device does not store an instance of the public data model that comprises current configuration and status information in a main memory of the network device;

identifying, by the API component, one or more of the internal data stores of the network based on references to the one or more data elements in the user request; and servicing, by the API component, the user request by directly accessing the one or more identified internal data stores, wherein the servicing of the user request is performed without duplicating the configuration and status information from the one or more identified internal data stores to a data structure instantiated in accordance with the public data model.

14. The method of claim 13, wherein the user request is expressed using gNMI (gRPC Network Management Interface) protocol.

15. The method of claim 13, wherein the user request is a request to store data in the network device, wherein servicing the user request includes writing the data to the one or more identified internal data stores.

16. The method of claim 13, wherein the user request is a request to read data stored in the network device, wherein servicing the user request includes reading the data from the one or more identified internal data stores and transmitting the read data to a consumer of the read data.

17. A network device comprising:
one or more computer processors; and
a computer-readable storage device comprising instructions that control the one or more computer processors to:
receive, via an application programming interface (API) component of the network device, a user request to access configuration information or status information in the network device, the user request being expressed in terms of one or more of the data elements of a public data model of the configuration and status information, wherein the configuration and status information is stored among a plurality of internal data stores in the network device, and wherein the network device does not store an instance of the public data model that comprises current configuration and status information in a main memory of the network device;
identify, via the API component, one or more of the internal data stores of the network based on references to the one or more data elements in the user request; and
service, via the API component, the user request by directly accessing the one or more identified internal data stores, wherein the servicing of the user request is performed without duplicating the configuration and status information from the one or more identified internal data stores to a data structure instantiated in accordance with the public data model.

* * * * *